Figure 3:
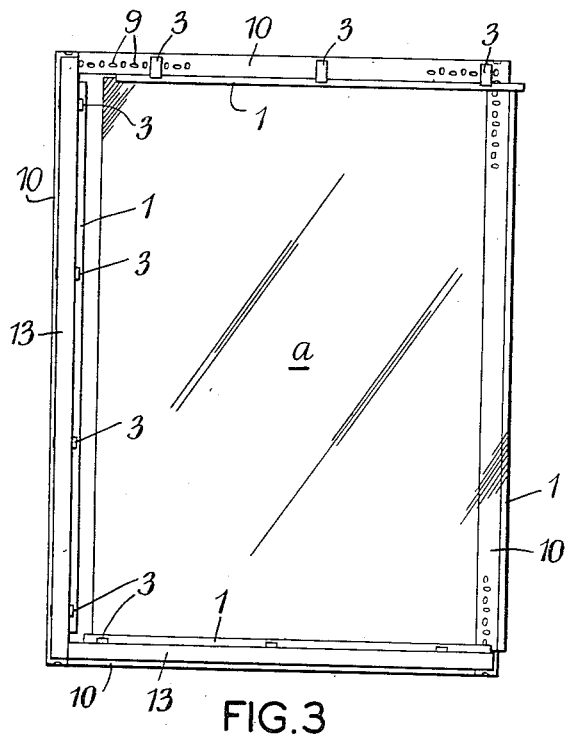

April 23, 1963

P. BOWERS 3,086,626

GLAZING AND CLADDING ARRANGEMENTS

Filed March 2, 1959

2 Sheets-Sheet 1

Inventor
Peter Bowers
by Sommers & Young
Attorneys

April 23, 1963  P. BOWERS  3,086,626
GLAZING AND CLADDING ARRANGEMENTS
Filed March 2, 1959  2 Sheets-Sheet 2
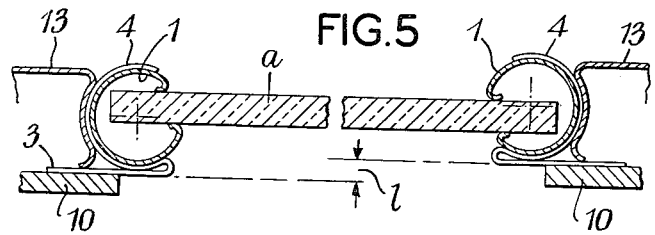
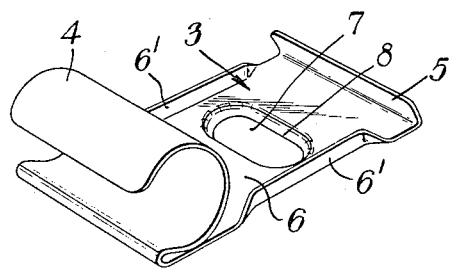
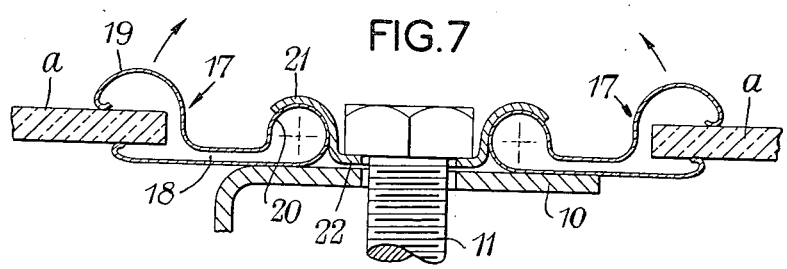
Inventor
Peter Bowers
by Sommers & Young
Attorneys

United States Patent Office 3,086,626
Patented Apr. 23, 1963

3,086,626
GLAZING AND CLADDING ARRANGEMENTS
Peter Bowers, London, England, assignor to
Dexion Limited, London, England
Filed Mar. 2, 1959, Ser. No. 796,336
Claims priority, application Great Britain Mar. 4, 1958
1 Claim. (Cl. 189—36)

This invention concerns improvements relating to arrangements for the attachment of glass and cladding material to frameworks, especially but not exclusively to frameworks made of so-called slotted angle, for the production, for example, of partitions in buildings. The invention seeks to provide a simple but effective arrangement which permits of easy erection and dismantling and which also permits of a considerable degree of adaptability or flexibility to meet practical requirements.

An arrangement for the purpose set forth comprises the combination of a tubular or like hollow member of springy or flexible material provided with a longitudinal gap in its wall for receiving one edge of a sheet of glass or cladding material and clip or clamp means securable to the framework for holding the hollow member in such a manner that it can turn or twist about its longitudinal axis, or an axis parallel thereto, to afford some adjustment of the position of the gap in the direction towards and away from the framework.

This arrangement has several advantageous features, especially in combination with a slotted-angle framework: The flexibility of the arrangement makes adequate provision for thermal expansion and other relative movement of, say, glass. Furthermore, the arrangement takes account of the fact that, in slotted-angle frameworks, the flanges of angle-members bounding the opening for the glass will not usually lie in one plane, and may not even be strictly parallel, because of overlapping flanges, distortion of the framework or the like. By turning and/or twisting, each hollow member can adjust itself to receive the respective edge of the glass sheet, irrespective of such distortion or differences between the planes of the several flanges to which the hollow members are attached by the clip means. Different thicknesses of glass or cladding material, such as thin board, can be accommodated on account of the springiness or flexibility of the hollow members. Erection, replacement of damaged glass and dismantling are very simple matters. None of the components need be spoilt in dismantling, so that they are available for further use. With a slotted-angle framework, clips can be bolted thereto, using any available holes. The bolts used in the framework itself need not be interfered with.

The arrangement in accordance with the invention preferably also comprises a capping strip which serves to cover not only part of the clips, by which it itself may also be secured, but also the framework member to which the hollow member is secured by the clips and the bolts therein.

Figure 2:
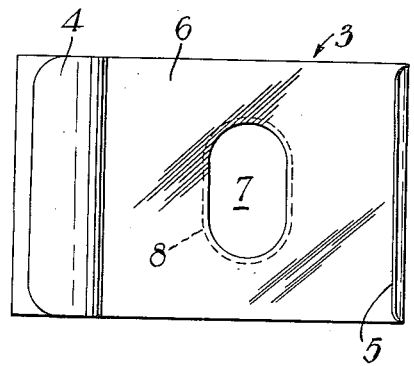
Figure 1:
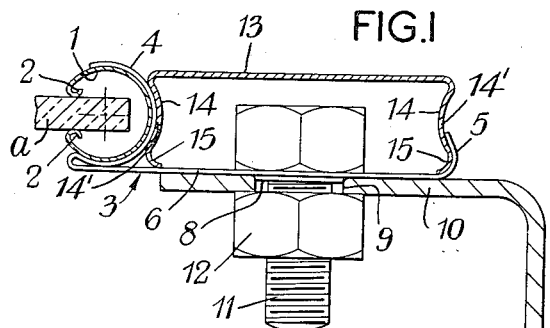
Figure 4:
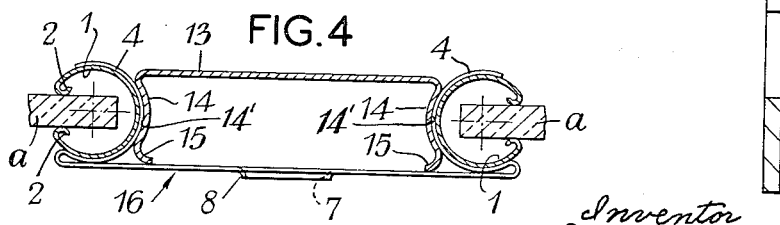

A preferred embodiment of the invention will now be more fully described by way of example and with reference to the accompanying drawing, in which:

FIGURE 1 is a cross-sectional view through a hollow sheet-receiving member, capping strip and clip bolted to a frame member, FIGURE 2 a plan view of the clip alone, FIGURE 3 a front view of a partially completed panel assembly, FIGURE 4 a cross-sectional view illustrating an alternative form of clip.

FIGURE 5 a cross-sectional view illustrating the self-adjusting capacity of the hollow members, FIGURE 6 a perspective view of a modified form of clip, and FIGURE 7 a cross-sectional view showing a modified arrangement.

Referring first of all to FIGURES 1 and 2, the hollow member is a simple tubular member 1 of thin springy metal slit longitudinally from end to end to leave a gap intended, say, for holding a pane $a$ of glass ⅛" thick, but tolerating material variation from that nominal thickness. The edges 2 bounding the gap are rolled inwardly to facilitate entry of the pane into the gap and its relative movement therein. The clips 3 consist each of a base portion comprising a length of thin springy metal bent at one end portion to form a part-circular formation 4, open on the outer side, into which the tubular member 1 can be snapped by a transverse movement and in which it is then capable of turning as mentioned above. The angular extent of the formation 4 is greater than 180° but considerably less that 360° so that a socket is provided which will retain a tubular member 1 therein. The other end of the clip has a small upstanding, slightly inturned, lip 5 for a purpose which will be explained. The intermediate portion 6 of the clip is flat and substantially tangential to the circular formation 4 and has a bolt hole 7 which is slightly elongated. Preferably and as illustrated, the hole 7 is elongated transversely of the clip and has a depressed margin 8 (seen most clearly in FIGURE 4) engageable in a bolt hole 9 in the framework member 10, in this instance in a hole elongated longitudinally of the said member. By this means accurate alignment of clips 3 in a line of clips can be ensured. Each clip is secured by a bolt 11, passed through the holes 7 and 9, and a nut 12. The capping strip 13 is of shallow channel section with externally concave flanges 14 and edges 15 which are rolled inwardly slightly. This strip can be secured by pushing it into the space between the part-circular formation 4 and the upstanding lip 5, by which it is then firmly held, masking all the bolts 11 and the bolt holes in the framework member 10 beneath it. The capping strip also affords additional support to the tubular member 1 by clamping against socket 4 with its concave part 14'.

FIGURE 3 shows a partially completed panel in which the clips 3 have been bolted to the left-hand and bottom framework members 10 and the tubular members 1 and capping strips 13 snapped into the said clips. The pane of glass $a$ with the tubular members 1 on its top and right-hand edges has been placed in the gap in the bottom tubular member 1 in the position shown and the clips 3 have been bolted to the top framework member to retain the top tubular member 1. The next step will be to slide the pane $a$, with the top and right-hand tubular members 1 to the left to enter the gap in the left-hand tubular member 1. Finally, clips are bolted to the right-hand framework member 10 and the top and right-hand capping strips 13 are snapped into position. The operation is thus extremely simple and requires no special skill. Unless they have been previously prepared, the tubular members 1 and capping strips 13 can be easily cut to length on the spot.

At mullions or in similar positions, a common capping strip 13 can be used between clips 3 associated with glass panes $a$ on each side. Preferably, however, a clip common to the two tubular members 1 at the edges of the said panes is used. Such a clip 16 is shown in FIGURE 4. It is similar to the clip 3 with the exception that the lip 5 is replaced by a second part-circular formation 4. The clip 16 is secured, like the clip 3, by a single bolt. The same capping strip 13 is employed, but is engaged between the two formations 4, where it bridges, and assists in supporting, the two members 1. Strip 13 therefore serves as a clamp for both sockets 4 thereby increasing the stability of the tubular members 1.

FIGURE 5 illustrates how the arrangement adjusts itself to a difference in level $l$ between framework members 10 at opposite sides of a pane $a$. The tubular members 1 turn about their axes to accommodate the difference.

FIGURE 6 illustrates a modified form of clip 3 in which edges 6' of the intermediate portion 6 are bent upwardly to stiffen the clip. This modification may also be applied to a clip otherwise similar to the clip 16 of FIGURE 4.

Various other modifications can be made: For some purposes, the capping strip 13 and the lip 5 on the clip 3 may be dispensed with. Separate clips 3 or 16 provided at intervals, as shown in FIGURE 3 may be replaced by a length of continuous, rolled, strip having the same cross-sectional shape as the clip 3 or the clip 16.

In place of a simple tubular member 1, use may be made of a hollow member 17, FIGURE 7, of double tubular shape with a flat portion 18 between two part-tubular portions 19, 20. The portion 19 has a gap for receiving the pane $a$, while the other portion 20 is engaged by clip means, as shown one end 21 of a double clip 22. Adjustment of the member 17 takes place by turning or twisting of the portion 19 about the axis of the portion 20. In place of a series of separate clips, use is preferably made in this case of a continuous rolled strip having the cross-section of the clip shown in FIGURE 7.

As a further alternative, the tubular member may be made in one piece with a clamping part formed by rolling the springy metal back on itself from the outer side of the slit and bending it to form a flange or lugs for securing it to the framework.

For some purposes, use may be made of a clip similar to the clip 3 except that it is provided, beyond the upstanding lip 5, with a tongue which extends outwardly parallel to the intermediate portion 6 and can be utilised for holding thin clading material at that end of the clip.

The capping strip 13 may be modified by providing it with flanged wing portions cover parts 4 and 1 and rendering the assembly waterproof. These wings may be provided by folding the material of the capping strip on itself at the sides of the channel and then bending it outwardly to form the wings.

Arrangements such as have been described above can be used with particular advantage in conjunction with slotted angle of the kinds described in the specification of Patent No. 3,025,933.

I claim:

Mounting means for sheet material comprising a base member having at one of its edge portions a resilient curved socket extending cylindrically through an angle of greater than 180° and considerably less than 360°, a hollow flexible tubular member having a longitudinally extending gap therein for accommodating an edge portion of a sheet of material, said tubular member being mounted in said socket with the said gap and the sheet therein at the free portion of said socket so as to provide angular adjustment of said sheet with respect to said base member, and a clamp member having a flange provided with a depression engaging against the back of said socket opposite its open portion to clamp said socket on said tube.

References Cited in the file of this patent

UNITED STATES PATENTS

| 798,309 | Voltz | Aug. 29, 1905 |
| 958,082 | Bland | May 17, 1910 |
| 1,834,512 | Asmus | Dec. 1, 1931 |
| 1,986,980 | Ross | Jan. 8, 1935 |
| 1,986,981 | Ross | Jan. 8, 1935 |

FOREIGN PATENTS

| 1,042,708 | France | Nov. 3, 1953 |